May 14, 1963 M. W. CRABB 3,089,646

PYTHAGOREAN SERVO COMPUTER

Filed June 13, 1960

MERLE WRIGHT CRABB
INVENTOR

BY Rankin A. Milliken
ATTORNEY 3,089,646

PYTHAGOREAN SERVO COMPUTER

Merle W. Crabb, Endicott, N.Y., assignor to General Precision, Inc., a corporation of Delaware Filed June 13, 1960, Ser. No. 35,775
3 Claims. (Cl. 235—192)

This invention relates to an improved servo computer of the type used for the solution of right triangles. More particularly, this invention relates to an improved servo computer of the type which automatically computes the hypotenuse of a triangle when the two sides are supplied as electrical inputs.

In the electronic computation arts, and more particularly in the flight simulation art, servo computers are used extensively. For instance, it may be desirable in the simulation of navigational data for flight training to compute the slant range of an aircraft A when given the altitude and the ground range from a fixed ground point P, as shown in FIG. 4.

The prior art method of making this computation involves the use of trigonometric functions of the elevation angle (i.e., the angle $\theta$ between the slant range line and the ground range line). The use of the prior art method necessitates the servo computation of the elevation angle $\theta$. The computation of the elevation angle necessarily involves the use of a pair of resolvers which, according to the present invention, may be dispensed with. In addition, the direct trigonometric computation of prior art devices necessarily involves the use of nonlinear computing elements, and the use of a greater number of summing amplifiers than is the case with the instant invention.

The present invention has as its machine equation a modification of the well known Pythagorean theorem. By the use of the modified Pythagorean theorem the necessity for the auxiliary computation of the elevation angle is obviated. According to one embodiment of the present invention, the entire computer system may be designed using only linear computing elements. The present invention also provides a computing system in which the number of summing amplifiers is reduced to three as compared with five in the systems of the prior art.

The present invention further provides a servo computer the machine equation of which is a modification of the Pythagorean theorem so selected that the main summing amplifier does not reach an "open loop" operating condition throughout the entire operating range of the circuit. By employment of this modified Pythagorean equation an embodiment of the instant invention is provided wherein all of the elements of the system are linear elements.

One of the objects of the invention resides in the provision of a Pythagorean servo computer by means of which the hypotenuse of a triangle may be computed, given the sides of the triangle, without the auxiliary computation of the angle between a side and the hypotenuse.

Another object of the invention is to provide a Pythagorean servo computer wherein all elements of the computer are linear elements.

A further object of the invention is to provide a Pythagorean servo computer wherein the main summing amplifier does not reach "open loop" operation throughout the operating range of the computer.

A still further object of the invention is to provide a Pythagorean servo computer for the solution of a triangle when given the sides of the triangle wherein the number of necessary summing amplifiers is substantially reduced over the number of summing amplifiers required in prior art devices.

The invention accordingly comprises the features of construction, combinations of elements, and the arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings in which.

Figure 1:
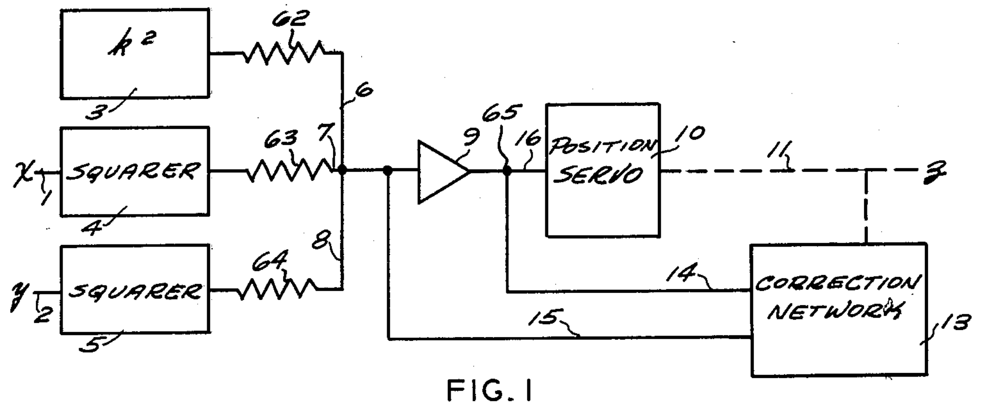
FIG. 1 shows a servo computer in accordance with the invention.

Referring to the figures, the computer servomechanism system shown in FIG. 1 comprises a first squaring device 4 into which an electrical signal corresponding to side $x$ of the triangle to be solved is fed by means of input lead 1, and a second squaring device 5 into which an electrical signal corresponding to side $y$ of the triangle to be solved is fed by means of input lead 2.

Reference numeral 3 designates a constant voltage source the output voltage level of which is referred to herein as $k^2$. The outputs of the two squarers, 4 and 5, and the constant voltage source 3 are fed to summing amplifier 9 by means of connecting leads 6, 7 and 8, which include input resistors 62, 63, and 64. The output of summing amplifier 9 is fed to position servo 10 by means of lead 16. Position servo 10 is preferably of the type which includes a stabilizing feedback loop wherein a tachometer type generator generates a signal proportional to the rate of angular displacement of the output shaft, which signal is fed back to the input of the servo amplifier; however, any position servo known to the prior art may be employed within the scope of this invention. Output shaft 11 is driven by position servo 10 in such manner that its angular displacement from an arbitrary reference is proportional to the hypotenuse of the triangle to be solved when said angular displacement is fed from shaft 11 to a correction network 13, which correction network is included in a feedback loop around amplifier 9 by means of leads 14 and 15. Said correction network is so designed as to effectively divide the output of amplifier 9 by the quantity $(z+k)$ where the value of $k$ is proportional to the square root of the output voltage of the constant voltage source 3. An embodiment of the correction network according to the invention is shown at 34 in FIG. 2. Thus it will be seen that the circuit of FIG. 1 produces angular deflection of the output shaft of position servo 10 proportional to hypotenuse $z$ of the triangle to be solved when input leads 1 and 2 of squarers 4 and 5 are excited with voltages proportional to the sides of the triangle to be solved.

Figure 2:
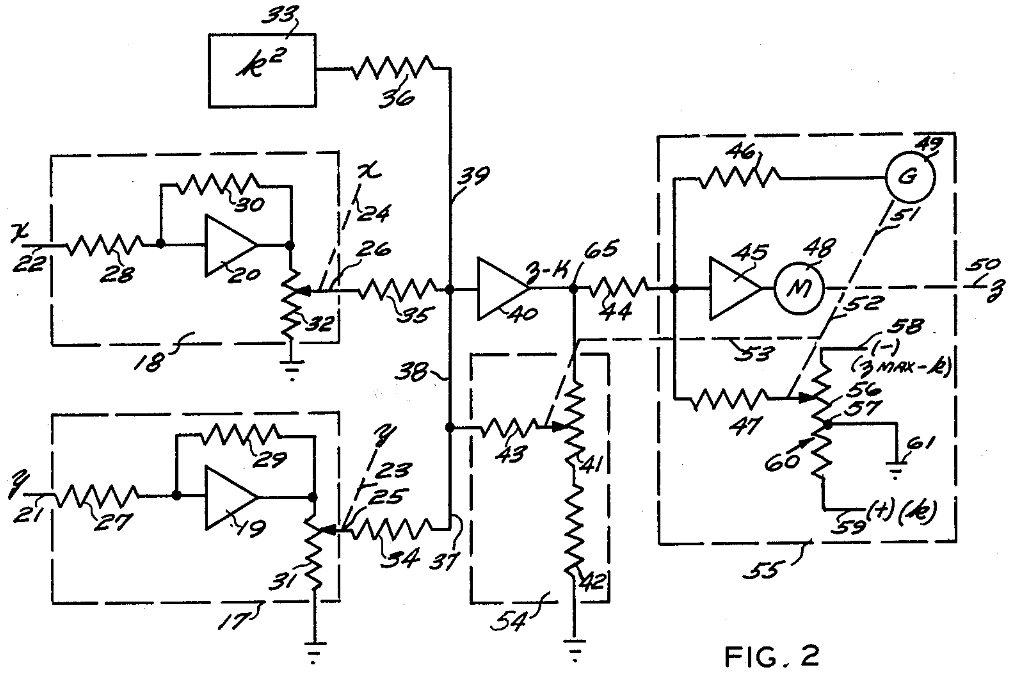
FIG. 2 shows a circuit according to a particular embodiment of the invention wherein all of the circuit elements are linear in character.

Referring now to FIG. 2, which shows in detail a specific embodiment of this invention, it will be noted that 17 and 18 comprise servo multipliers of the type well known in the prior art, so arranged that both the electrical inputs to input terminals 21 and 22 and the mechanical inputs to input shafts 23 and 24 are proportional to the sides $y$ and $x$, respectively, of the triangle to be solved. Thus, it will be seen that servo multipliers 17 and 18 function to produce $-y^2$ and $-x^2$ at their respective output terminals 25 and 26.

The parameters of amplifiers 19 and 20, and the values of input resistors 27 and 28, feedback resistors 29 and 30, and potentiometers 31 and 32 may be determined by principles well known in the prior art as found, for instance, in the volume "Electronic Analog Computers"

by Granino A. Korn and Theresa M. Korn, McGraw-Hill Book Company, Inc., 1956.

Figure 3:
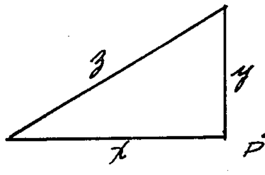
FIG. 3 shows the nomenclature employed hereinbelow.
Figure 4:
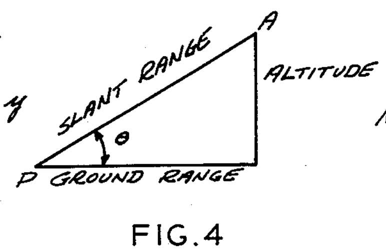
FIG. 4 shows the relationship between the slant range, the ground range, the altitude, and the elevation angle $\theta$.

Reference numeral 33 designates a constant voltage source the output voltage of which is arbitrarily selected, and will hereinafter be designated $k^2$. The ouputs of multiplier servos 17 and 18 and constant voltage source 33 are fed to the input of summing amplifier 40 by means of input resistances 34, 35 and 36 and leads 37, 38 and 39. Amplifier 40 may be a summing amplifier of conventional design as described, for instance, on pages 14 through 16 of the above-cited text. Connected across the input and output terminals of amplifier 40 is a feedback network comprising resistors 42 and 43 and servo-driven potentiometer 41. The values of resistors 42 and 43 and the value of potentiometer 41 are so selected that the signal fed back to the input of summing amplifier 40 will at all times be equal to $(z+k)$, thus providing that the signal appearing at point 65 will at all times equal $(z-k)$. The resistors 42 and 43 and servo driven potentiometer 41, connected as shown in FIG. 2, will hereinafter be referred to as correction network 54. The output of the network comprising amplifier 40 and correction network 54 is fed through input resistance 44 to position servo 55. Position servo 55 comprises amplifier 45, servomotor 48, tachometer generator 49, and output shaft 50 with shaft couplings 51, 52 and 53, all interconnected as shown in FIG. 2. Output coupling 51, tachometer generator 49, and resistance 46 are interconnected to form a rate feedback path for stabilization. A second feedback loop is comprised of coupling 52 driving potentiometer 60, and resistance 47. Potentiometer 60 is so coupled to output shaft 50 by means of coupling 52 that, when properly excited in the manner taught hereinbelow, it feeds back to the input of amplifier 45 a potential proportional to the quantity $(z-k)$, thereby assuring zero error signal to amplifier 45 when the position of shaft 50 is proportional to the hypotenuse of the triangle to be solved. In order to feed back the correct signal, proportional to $(z-k)$, potentiometer 60 has connected to its terminals 58 and 59 direct current sources the voltages of which with respect to ground are proportional to the maximum value of the hypotenuse minus $k$ and to plus $k$, respectively. Potentiometer 60 is tapped and grounded at a point 61 which is the point occupied by the slider when $z=k$. Mechanical coupling 53 drives the slider of potentiometer 41 in correction network 54 in angular deflections proportional to the quantity $z$ as derived from output shaft 50 of position servo 55. Correction network 54, when so driven, provides that the signal appearing at the output of amplifier 40 is proportional to $(z-k)$ in the manner noted hereinabove. Thus, it may be seen that the servo system shown in FIG. 2 produces angular deflections of its output shaft 50 in direct proportion to the value of the hypotenuse $z$ of the triangle illustrated in FIG. 3 when electrical inputs, and mechanical inputs, proportional to the sides $x$ and $y$, respectively of the triangle of FIG. 3 are fed to servo multipliers 18 and 17. Said mechanical inputs may, of course, be derived directly from said electrical inputs by simple servo means. It will further be seen that the system shown in FIG. 2 accomplishes this result in a manner more expeditious than that of prior art devices.

It is to be noted that the system of FIG. 2 is composed entirely of linear elements by virtue of which accuracy of computation is more easily obtained by the designer applying the principles taught herein to the design of the servo computer circuit than was the case with prior art devices.

It will be further noted that the servo computer system shown in FIG. 2 by virtue of the employment of the constant $k^2$ as detailed hereinbelow, is so arranged that correction network 54 is not driven to low feedback values, i.e., is not driven into an area of operation wherein amplifier 40 goes to an open loop operating condition anywhere over the operational range of inputs $x$ and $y$.

Analysis of the circuit of FIG. 2 will show that the machine equation of the circuit is $$x^2+y^2-k^2=z^2-k^2=(z+k)(z-k)$$

wherein $x$ and $y$ are the sides of the triangle to be solved, and $z$ is the hypotenuse thereof as indicated in FIG. 3, and wherein the constant $k^2$ corresponds to the voltage output of constant voltage source 33. By resort to this modified form of the theorem of Pythagoras it is made possible to operate the circuit shown in FIG. 2 in such a way that correction network 54 is at no time driven into its low feedback region of operation, thereby avoiding open loop operation of amplifier 40.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A servo computer comprising: first squaring means; second squaring means; constant voltage source means; summing amplifier means; position servo means; and correction network means; wherein said first and said second squaring means and said constant voltage source means provide input potentials to said summing amplifier means; said summing amplifier means provides an input potential to said position servo means; said correction network is connected in a feedback path across said summing amplifier means; and the output shaft of said position servo provides an input to said correction network; whereby the angular position of said output shaft is proportioned to the electrical inputs to said first and second squaring means as the hypotenuse of a right triangle of which the sides are proportional to the inputs of said first and second squaring means respectively.

2. A servo computer comprising: first squaring means comprising a multiplier servo; second squaring means comprising a multiplier servo; constant voltage source means; summing amplifier means; position servo means; and correction network means; wherein said first and said second squaring means and said constant voltage source means provide input potentials to said summing amplifier means; said summing amplifier means provides an input potential to said position servo means; said correction network is connected in a feedback path across said summing amplifier means; and the output shaft of said position servo providees an input to said correction network; whereby the angular position of said output shaft is proportioned to the electrical inputs to said first and said second squaring means as the hypotenuse of a right triangle of which the sides are proportional to the inputs of said first and second squaring means respectively.

3. A servo computer comprising: first squaring means comprising a servomultiplier; second squaring means comprising a servomultiplier; constant voltage supply means; summing amplifier means; position servo means; and correction network means; wherein said first and said second squaring means and said constant voltage source means provide input potentials to said summing amplifier means; said summing amplifier means provides an input potential to said position servo means; and said correction network, comprising a potentiometer driven by the output of said position servo means, is connected in a feedback path across said summing amplifier means; whereby the angular position of said output shaft is proportioned to the electrical inputs to said first and second squaring means as the hypotenuse of a right triangle of which the sides are proportional to the inputs to said first and said second squaring means respectively.

References Cited in the file of this patent

UNITED STATES PATENTS

| | | |
|---|---|---|
| 2,473,414 | Darlington | June 14, 1949 |
| 2,688,442 | Droz et al. | Sept. 7, 1954 |
| 2,872,112 | Greenwood | Feb. 3, 1959 |
| 2,938,671 | Strom | May 31, 1960 |